United States Patent [19]
Farwell et al.

[11] Patent Number: 5,751,712
[45] Date of Patent: May 12, 1998

[54] TECHNIQUE FOR EFFICIENTLY ALLOCATING BANDWIDTH TO MULTIMEDIA CALLS IN A COMMUNICATIONS SYSTEM

[75] Inventors: Charles Yeomans Farwell, Denver; Paul M. Gerhardt, Boulder, both of Colo.; Hassan Hagirahm, Long Branch, N.J.; David Martin Sueper, Brighton; Terry L. Zrust, Thornton, both of Colo.

[73] Assignee: Lucent Technologies, Murray Hill, N.J.

[21] Appl. No.: 736,699

[22] Filed: Oct. 28, 1996

[51] Int. Cl.$^6$ ............................................. H04J 3/16
[52] U.S. Cl. .................. 370/431; 370/437; 370/465; 370/468
[58] Field of Search .......................... 370/431, 433, 370/436, 437, 442, 464, 465, 468, 478, 477, 487, 493, 537, 538, 539, 540, 252, 253, 352, 353, 354, 355, 356, 400, 401, 410

[56] References Cited

U.S. PATENT DOCUMENTS

| | | | |
|---|---|---|---|
| 5,130,932 | 7/1992 | Ash et al. | 370/468 |
| 5,132,966 | 7/1992 | Hayano et al. | 370/468 |
| 5,140,938 | 8/1992 | Jurkevich et al. | 370/468 |
| 5,301,191 | 4/1994 | Otani | 370/468 |
| 5,497,504 | 3/1996 | Acampora et al. | |
| 5,638,363 | 6/1997 | Gittins et al. | 370/468 |
| 5,673,253 | 9/1997 | Shaffer | 370/468 |

Primary Examiner—Wellington Chin
Assistant Examiner—Huy D. Vu

[57] ABSTRACT

In a multimedia communications system where bandwidth of an access facility is limited, the bandwidth is partitioned into three bands dedicated to audio, video and data traffic, respectively, in accordance with blocking probabilities associated with the respective media types. The value of each blocking probability is selected pursuant to the relative importance of the associated media type in a multimedia service. With the blocking probabilities in place, the dominance of traffic of a particular media type, which may be relatively unimportant in the service, would not cause blocking of traffic of other media types, which may be relatively important.

24 Claims, 5 Drawing Sheets

BANDWIDTH OF FACILITY 117

FIG. 4A

| | AUDIO BLOCKING PROBABILITY (%) | NO. OF B-CHANNELS | VIDEO BLOCKING PROBABILITY (%) | NO. OF B-CHANNELS | DATA BLOCKING PROBABILITY (%) | NO. OF B-CHANNELS | |
|---|---|---|---|---|---|---|---|
| SERVICE 401 | 0.1 | i | 0.5 | j | 0.1 | k | } 403 |
| | 0.1 | i | 0.5 | j | 1 | k-3 | |
| | 0.1 | i | 0.5 | j | 2 | k-5 | } 405 |
| | 0.1 | i | 0.5 | j | 3 | k-9 | |
| | 0.1 | i | 0.5 | j | 5 | k-12 | |
| | 0.1 | i | 0.5 | j | 10 | k-17 | |

FIG. 4B

| | AUDIO BLOCKING PROBABILITY (%) | NO. OF B-CHANNELS | VIDEO BLOCKING PROBABILITY (%) | NO. OF B-CHANNELS | DATA BLOCKING PROBABILITY (%) | NO. OF B-CHANNELS | |
|---|---|---|---|---|---|---|---|
| SERVICE 411 | 0.1 | i | 0.5 | j | 0.1 | k | |
| | 0.1 | i | 1 | j-3 | 0.1 | k | |
| | 0.1 | i | 2 | j-7 | 0.1 | k | } 413 |
| | 0.1 | i | 3 | j-10 | 0.1 | k | } 415 |
| | 0.1 | i | 5 | j-15 | 0.1 | k | |
| | 0.1 | i | 10 | j-25 | 0.1 | k | |

TECHNIQUE FOR EFFICIENTLY ALLOCATING BANDWIDTH TO MULTIMEDIA CALLS IN A COMMUNICATIONS SYSTEM

FIELD OF THE INVENTION

The invention relates generally to multimedia communications systems and, more particularly, to a communications system administering control on bandwidth allocation to audio, data and/or video calls therein.

BACKGROUND OF THE INVENTION

Traditional communications have been by telephone involving audio media only. With the advent of technology and ever-demanding communications needs, multimedia services emerge such as video conferencing, CD-ROM applications and Internet services, involving communications on a combination of audio, data and video media.

In the business arena, workstations or personal computers (PCs) having multimedia capabilities are employed to increase productivity. In a business location, the workstations are typically connected to one another via a local area network (LAN) such as the Ethernet LAN to facilitate communications between employees. For communications with a remote location, wide area networking facilities are commonly used. In addition, multimedia servers have been developed to interface a LAN with a wide area network (WAN) to provide multimedia services between two distant locations. However, multimedia calls normally demand more communication bandwidth than traditional telephone calls, and it is costly to allocate much bandwidth to each multimedia call in a limited bandwidth setting, which is usually the case.

Accordingly, there exists a need for a methodology in a multimedia communications system for cost-effectively allocating bandwidth to multimedia calls.

SUMMARY OF THE INVENTION

In accordance with the invention, a multimedia service processor is employed in a communications system to allocate bandwidth for each of the audio, video and data media type communications. The bandwidth allocation is based on at least a predetermined blocking probability associated with each media. The blocking probability is defined as the likelihood that the traffic of the associated media would be blocked because of the unavailability of system resources including the limited bandwidth allocated thereto. The value of the blocking probability varies inversely with the relative importance of the media type of the traffic in the system.

Specifically, before a call is established in the system, the multimedia service processor identifies each media involved in that call. The processor allows the call to go through when the bandwidth allocated to at least one of the identified media is sufficient for communications of the information associated therewith.

BRIEF DESCRIPTION OF THE DRAWING

In the drawing.

Throughout this disclosure, unless otherwise stated, like elements, components and sections in the figures are denoted by the same numerals.

DETAILED DESCRIPTION

Figure 1:
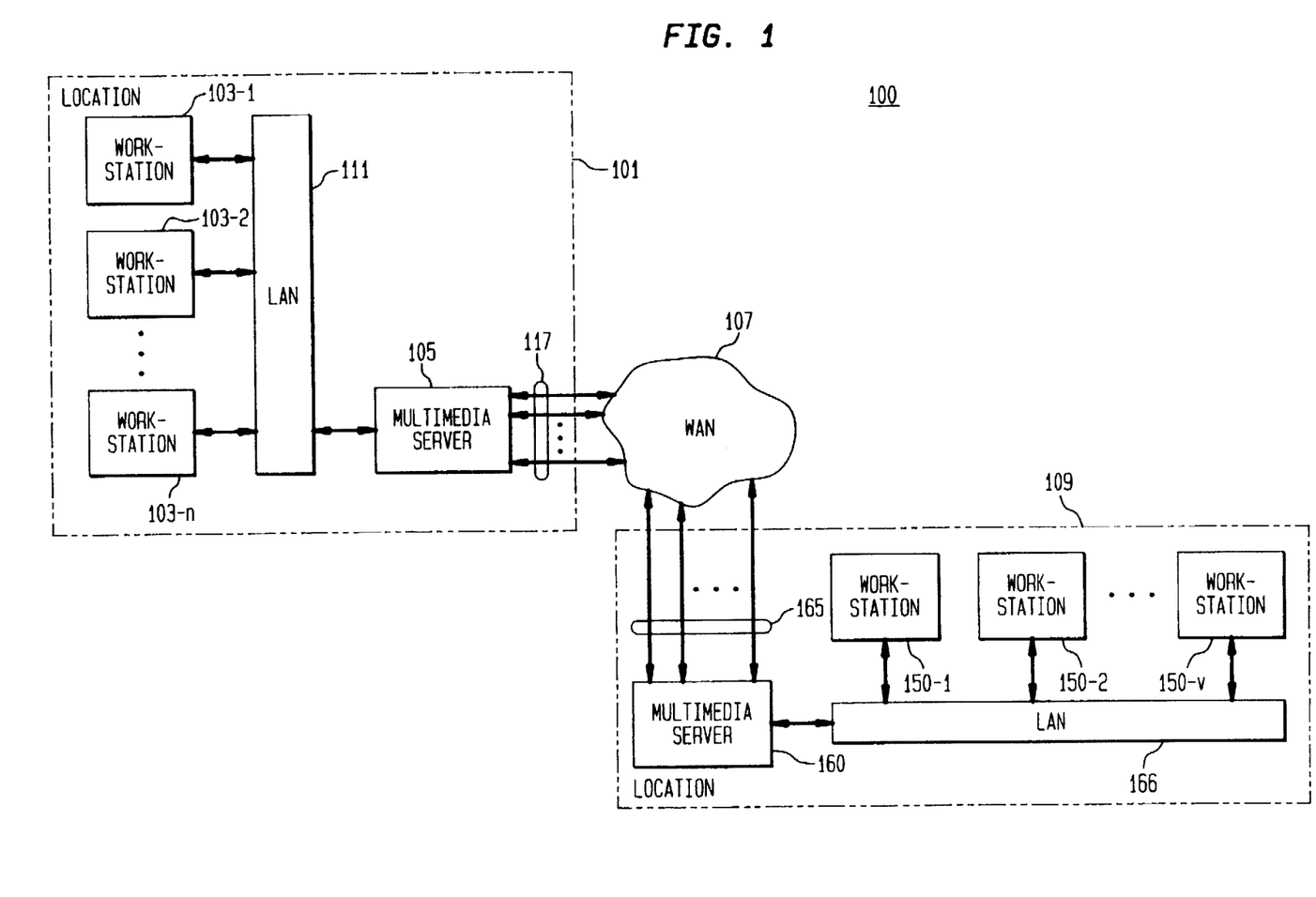
FIG. 1 illustrates multimedia communications system in accordance with the invention.

FIG. 1 illustrates multimedia communications system 100 embodying the principles of the invention. In system 100, two distant locations 101 and 109 communicate with each other through standard wide area network (WAN) 107. In location 101, workstations (or PCs) 103-1 through 103-n are connected to multimedia server 105 via local area network (LAN) 111, where n is a positive integer. Each workstation is equipped with a standard data entry facility including a keyboard, and point-and-click device; audio facility including a telephone handset; and video facility including a camera. With these facilities, the workstations in location 101 may communicate through a combination of audio, data and video media with workstations having similar hardware in location 109.

Figure 2:
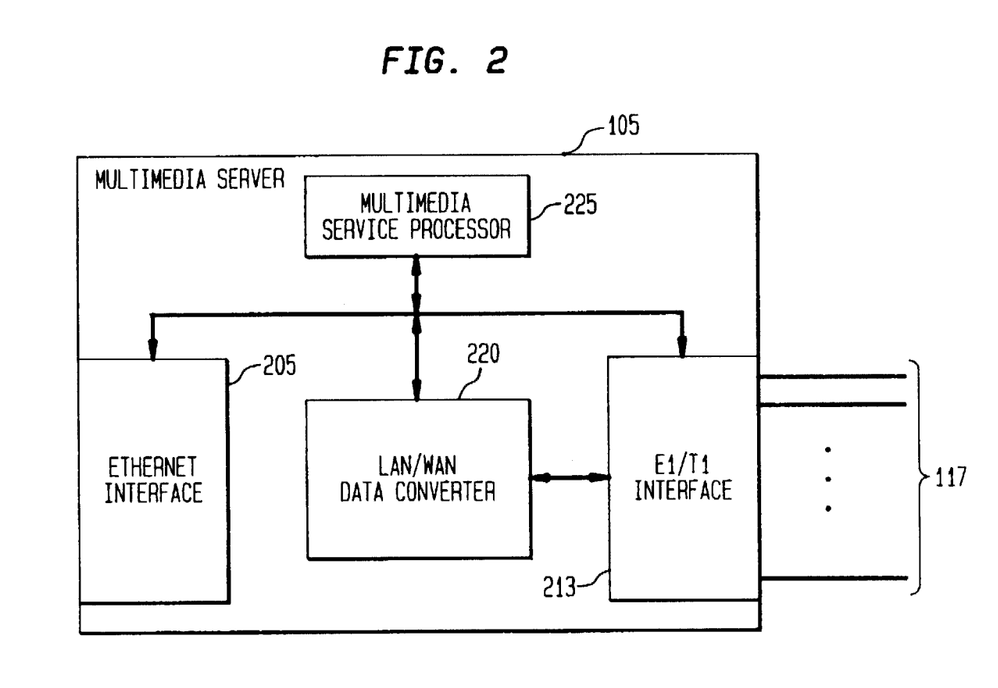
FIG. 2 is a block diagram of a multimedia server in the system of FIG. 1.

In this illustrative embodiment, LAN 111 is a switched or shared Ethernet LAN which supports real-time communications. Referring to FIG. 2, server 105 is a LAN-based server connected to LAN 111 through Ethernet interface 205. On the other end, server 105 provides, at E1/T1 interface 213, integrated services digital network (ISDN) primary rate interface (PRI) facility 117 for accessing WAN 107. Server 105 also includes LAN/WAN converter 220 which, in one direction, converts information streams from LAN 111 which are in an internet protocol (IP) format to a format compatible to WAN 107. The conversion includes dividing IP streams from LAN 111 into 64 Kbps increments, and inserting proper framing into the fragmented streams, pursuant to a standard point to point and multilayer protocol (PPP/MP). In the other direction, converter 220 performs the inverse function to the LAN-to-WAN conversion, and converts the traffic from WAN 107 to IP streams compatible with LAN 111.

In addition, server 105 includes multimedia service processor 225, which is programmed to orchestrate the operation of server 105 and manage different multimedia service features. In particular, processor 225 administers blocking control on multimedia calls utilizing the limited bandwidth of PRI facility 117, in accordance with the invention. The blocking control operation of processor 225 is fully described hereinbelow.

Referring back to FIG. 1, location 109 includes multimedia server 160 which is structurally identical to server 105. Similarly, server 160 is connected to multimedia workstations 150-1 through 150-v through switched or shared Ethernet LAN 166, where v is a positive integer. On the other end, server 160 provides ISDN PRI facility 165 for accessing WAN 107.

It should be noted at this point that discussions herein regarding location 101 (including server 105 and facility 117) are similarly applicable to location 109 (including server 160 and facility 165) as the latter is a mirror image to location 101.

By way of example. ISDN PRI facility 117 comprises standard T1 lines, which is most likely the case in the United States, and each PRI in facility 117 provides a 1.544 Mbps transport interface. (Alternatively, facility 117 may comprise E1 lines, which is most likely the case in foreign countries, and each PRI then provides a 2.048 Mbps transport interface.) In accordance with the ISDN PRI standard, each T1 line carries 24 B-channels each transporting 64 Kbps audio, data and/or video information. These B-channels may carry clear-channel information, or may use HDLC framing to package multimedia information. One of the 24 B-channels may be used as a D-channel providing ISDN signaling for multimedia call establishment and disconnection, and maintenance control.

In addition, the ISDN PRI standard provides for logically grouping multiple B-channels into a wider band channel of 344 through 1,536 Kbps capacity. With this flexibility, a channel carrying audio, data and/or video information can be dynamically sized in B-channel increments in response to the traffic needs. For example, after a voice call has been established between workstation 103-1 in location 101 and workstation 150-1 in location 109 over a PRI link, server 105 can establish with server 160, as the need arises, additional B-channels for video and data over the same link, and aggregate the additional channels into one or more PPP logical channels, resulting in a synchronized delivery of multimedia information.

Typically, a data connection with bursty traffic has average and maximum bit rates each varying from a few thousand bits per second to a few million bits per second. Calls utilizing a standard transmission control protocol (TCP) typify the data connection. The bit rate required for a voice or audio connection is normally in the range of 32 to 64 Kbps. Similarly, a video connection calls for a variety of bit rates. For example, the bit rate required for video information encoded according to the H.261 standard is p×64 Kbps, where p=2, 4, 6, . . . . In the case of J-PEG encoding, the required bit rate is about 1 Mbps. Unlike data calls, video and audio calls are normally transmitted pursuant to a standard user datagram protocol (UDP).

Point-to-point connections are established between workstations in respective locations 101 and 109 using ISDN signaling over a D-channel pursuant to an ITU Q.931 protocol. The D-channel may control only the B channels associated therewith on a particular PRI link over which a point-to-point connection is made. In an alternative, non-facility associated signaling (NFAS) arrangement, the D-channel may control B-channels on other links as well.

A traditional multimedia server allocates bandwidth of the PRI facility to audio, data and video calls on a per call basis and, more particularly, on a first-come-first-served basis. As each new call arrives, the server attempts to accommodate the call, regardless of its media type. The call is blocked (i.e., denied access to the WAN) only when the bandwidth available on the PRI facility is insufficient for the new call.

However, in multimedia applications in general, the relative importance of the media involved depends on the type of multimedia application invoked by the call. Based on the past experience, we have determined that the audio media is generally essential for each call. However, the relative importance of the video media with respect to the data media is application dependent. For engineering and financial types of multimedia applications for example, the data media normally takes precedence over the video media. On the other hand, in an entertainment type of application, the video media normally takes precedence over the data media. Accordingly, it is desirable to have a multimedia communications system such as system 100 affording the flexibility of allocating limited system resources to each media according to its relative importance. Thus, for example, with this flexibility, in the engineering multimedia application where audio and data media are more important than the video media, system 100 can be arranged in such a way that audio traffic and data traffic are more readily admitted to PRI facility 117 than video traffic.

The cost of system 100 varies directly with the number of PRI's provided in facility 117. In accordance with the invention, a service parameter, referred to as a "Blocking Probability", for traffic of each media type traversing facility 117 is enforced to efficiently utilize the bandwidth thereof. The blocking probability for a particular media type traffic in a multimedia service is defined as the likelihood that such traffic would be blocked because of unavailability of system resources (the bandwidth of facility 117 in this instance) allocated thereto. The value of the blocking probability varies inversely with the relative importance of the type of media traffic in the multimedia service.

Figure 3:
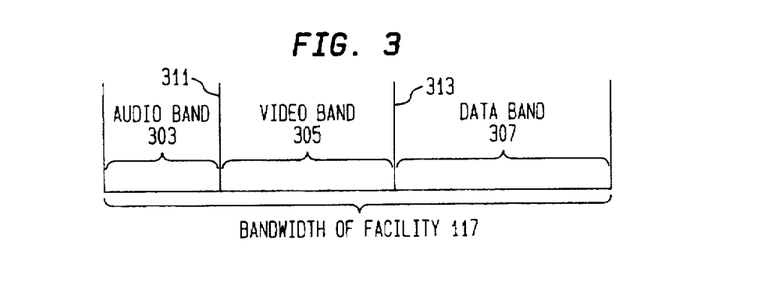
FIG. 3 illustrates a first scheme whereby bandwidth of an access facility in the system of FIG. 1 is allocated for use by traffic of different media types.

To realize the blocking probability for each media type, the bandwidth of facility 117, comprising a number of B-channels, is divided in a manner depicted in FIG. 3. The resulting bands 303, 305 and 307 separated by partitions 311 and 313 are dedicated to the audio, video, and data traffic, respectively. It should be pointed out that the relative width of each band corresponds to a fraction of the bandwidth or number of B-channels on facility 117. The actual amount of bandwidth available on facility 117 and the particular manner in which the bandwidth is partitioned depend on the system user needs and the relative importance of each media type in the multimedia service to which the user subscribes. It is apparent that the lower the blocking probability required for the traffic of a particular type, the wider the band (corresponding to a higher number of B-channels) dedicated to that particular media type is. In implementation, all channels carrying audio information to and from location 101 are multiplexed and derived from band 303; all channels carrying video information are multiplexed and derived from band 305; and all channels carrying data are multiplexed and derived from band 307. Advantageously, with the blocking probabilities in place, the dominance of traffic of a particular media type, which may be relatively unimportant, would not cause blocking of traffic of other media types, which may be relatively important.

Figure 4A:
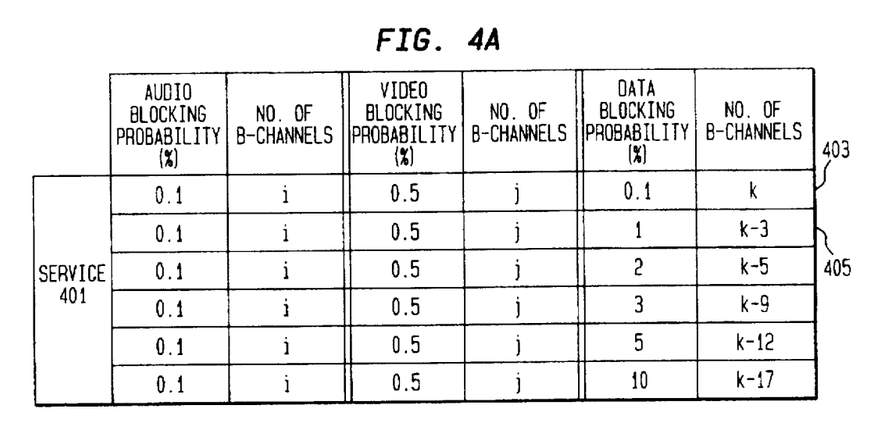
FIG. 4A illustratively tabulates the number of required channels for a respective media type, given a blocking probability associated therewith in a video intensive service, in accordance with the invention.

FIG. 4A illustratively tabulates the numbers of B-channels required of facility 117 for traffic of the respective media types, given the corresponding blocking probabilities in multimedia service 401. Service 401 includes, for example, video conferencing applications, and is video intensive. In order to maintain satisfactory quality of service, the blocking probability for video traffic is illustratively set at 0.5%. It should be noted that in practice 0.5% is a very low blocking probability for video communications. The corresponding number of B-channels needed in this instance is j, which is a positive number. Since we have determined that audio traffic is generally important in multimedia applications, the blocking probability therefor is illustratively set at 0.1%. The corresponding number of B-channels needed in this instance is i, which is a second positive number. FIG. 4A also enumerates different blocking probabilities for data traffic in service 401, and the corresponding numbers of B-channels required. For example, referring to row 403, a blocking probability of 0.1% for data traffic corresponds to k required B-channels, where k is a third positive number. Referring to row 405, a blocking probability of 1% corresponds to (k-3) required B-channels. It is apparent that by increasing the data blocking probability, the corresponding number of required B-channels decreases. Thus, FIG. 4A is important to a system user who subscribes to service 401 for establishing a communications budget. The user may be satisfied with a relatively high blocking probability for data traffic which is not as important as other media type traffic in service 401, and saves on the cost of B-channels as fewer B-channels would be needed.

Figure 4B:
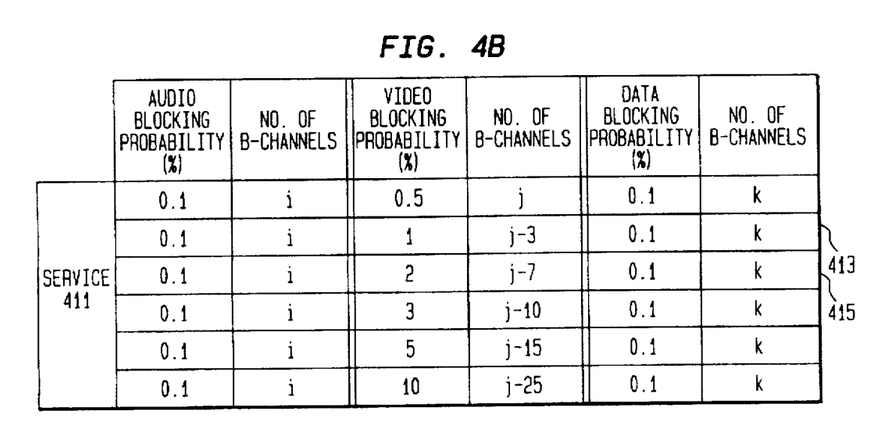
FIG. 4B illustratively tabulates the number of required channels for a respective media type, given a blocking probability associated therewith in a data intensive service, in accordance with the invention.

Similarly, FIG. 4B illustratively tabulates the numbers of B-numbers required of facility 117 for traffic of the respective media types, given the corresponding blocking probabilities in multimedia service 411. Service 411 includes, for example, data sharing applications and is data intensive. In order to maintain satisfactory quality of service, the blocking probability for data traffic is illustratively set at 0.1% which, in practice, is very low for data communications. Thus, the corresponding number of B-channels needed in this instance is k. Again, the blocking probability for audio traffic is illustratively set at 0.1%, and the corresponding number of B-channels needed is i. FIG. 4B also enumerates different blocking probabilities for video traffic in service 411, and the corresponding numbers of B-channels required. For example, referring to row 413, a blocking probability of 1% for video traffic corresponds to (j-3) required B-channels. Referring to row 415, a blocking probability of 2% corresponds to (j-7) required B-channels. Again, by increasing the video blocking probability, the corresponding number of required B-channels decreases. The user in this instance may be satisfied with a relatively high blocking probability for video traffic which is not as important as other media type traffic in service 411, and saves on the cost of B-channels as fewer B-channels would be needed.

It should be noted that, in FIGS. 4A and 4B, the number of channels required for (or dedicated to) a particular media type only corresponds to the blocking probability associated with that media type, and is independent of the number of channels required for another media type. In particular, the values of i, j and k are independently derived. In other words, once the blocking probability for traffic of a particular media type is determined, the corresponding number of B-channels needed to meet such a blocking probability is defined, regardless of the numbers of channels required for other media types.

Referring briefly back to FIG. 3, each of bands 303, 305 and 307 is permanently allocated to the corresponding media as partitions 311 and 313 are static and do not move over time. Accordingly, the blocking probabilities for the audio, video, and data traffic in the multimedia service is said to be "guaranteed."

Figure 5:
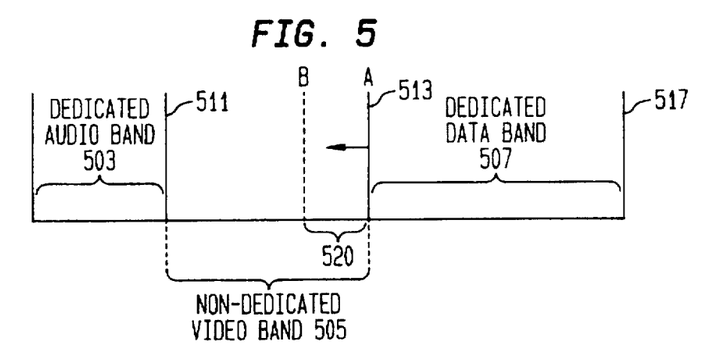
FIG. 5 illustrates a second scheme whereby bandwidth of the access facility is allocated for use by traffic of different media types.

In an alternative embodiment, at least one of the above two partitions is not static but dynamic. FIG. 5 illustrates the bandwidth allocation in such an alternative embodiment. As shown in FIG. 5, the bandwidth of facility 117 is divided by partitions 511 and 513 into dedicated audio band 503, non-dedicated video band 505 and dedicated data band 507. Like partitions 311 and 313, partition 511 is static and does not move over time. As such, audio band 503 is dedicated to audio traffic. However, partition 513 is dynamic and may move between positions A and B. As a data traffic need arises, partition 513 may move from position A toward position B and in effect expand the data band into video band 505. Data/video band 520 between positions A and B represents the spare bandwidth to the data traffic at the expense of video band 505. That is, video traffic utilizing the bandwidth represented by data/video band 520 would be blocked in favor of data traffic when the latter requires more bandwidth than dedicated data band 507 can offer.

The bandwidth allocation depicted in FIG. 5 is particularly advantageous to a data intensive service such as service 411 described above. This stems from the fact that in such a service the user is more concerned about the audio and data traffic than the video traffic. In the allocation as illustrated, since the data traffic is allowed to utilize a portion of the video band, but not vice versa, the blocking probability for the video traffic is not guaranteed, and subject to the expansion of the data band. However, the blocking probabilities for the audio and data traffic are guaranteed, and the guaranteed probabilities correspond to dedicated band 503, and dedicated band 507 plus data/video band 520, respectively. A saving on the bandwidth is realized as dedicated data band 507 is narrower than band 307 to achieve the same guaranteed blocking probability.

The converse to the above is true for a video intensive services such as service 401 previously described. In such a service, video traffic may utilize part of the data capacity when the video traffic requires more bandwidth than the dedicated video band can offer.

Figure 6:
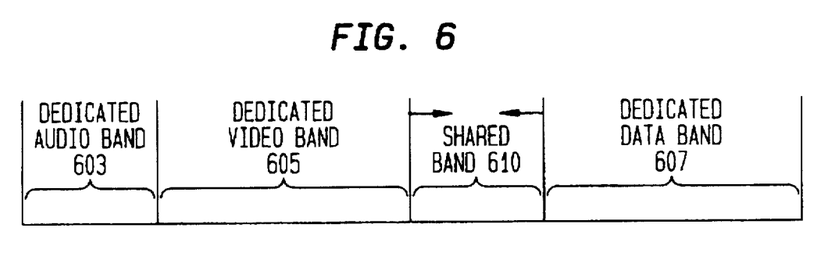
FIG. 6 illustrates a third scheme whereby bandwidth of the access facility is allocated for use by traffic of different media types.

FIG. 6 illustrates yet another allocation of bandwidth of facility 117 to audio, data and video traffic. In this example, the user requires a guaranteed blocking probability for the audio traffic, but is satisfied with a range of blocking probabilities, say, between 5 and 10 percent for each of the video and data traffic. To that end, band 603 is dedicated to the audio traffic and corresponds to the required guaranteed blocking probability; band 605 is dedicated to the video traffic and corresponds to the upper limit (in this instance 10%) of the blocking probability range associated therewith; and band 607 is dedicated to the data traffic and corresponds to the upper limit (in this instance also 10%) of the blocking probability range associated therewith.

To achieve the lower limits of the two probability ranges (both 5% in this instance), band 610 is instituted for shared use of the data and video traffic according to a first-come-first-served policy. The size of band 610 is determined in such a way that the requirements of both lower limits would be met. For example, let's say 10 B-channels additional to band 605 are needed to reduce the video blocking probability from 10 to 5 percent. Furthermore, let's say three B-channels additional to band 607 are needed to reduce the data blocking probability from 10 to 5 percent. In order to meet the above requirements of lower limits for both traffic, the size of shared band 610 must correspond to the higher of the two numbers of additional channels needed, i.e., 10 channels.

Figure 7:
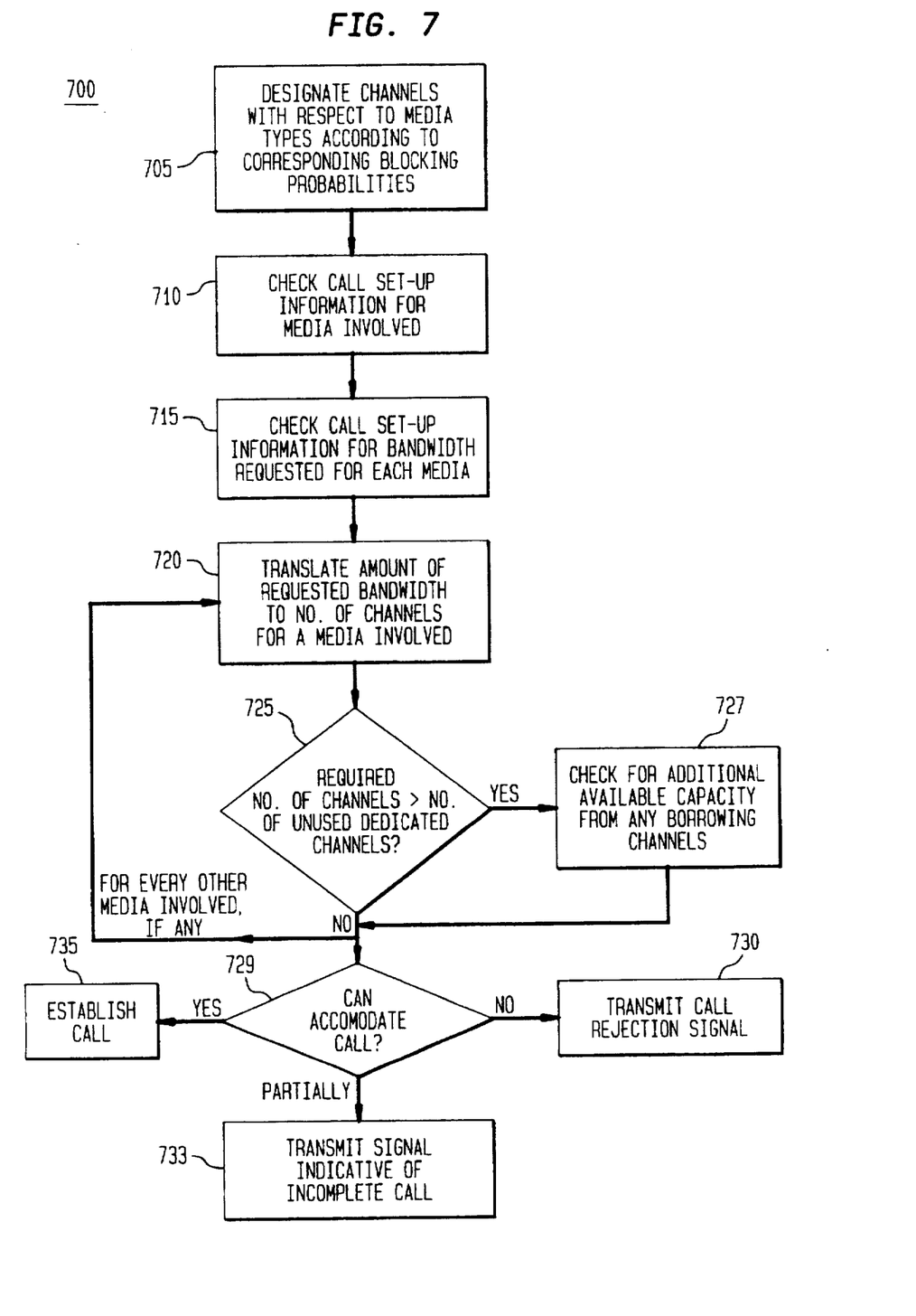
FIG. 7 is a flow chart depicting the steps of a bandwidth management process run by a multimedia service processor in the system of FIG. 1.

The blocking control operation of multimedia service processor 225 will now be described. Processor 225 allocates bandwidth of PRI facility 117 to incoming and outgoing multimedia calls during the establishment of the calls, and operates in accordance with bandwidth management process 700. As shown in FIG. 7, at step 705 of process 700, before any call establishment, the B-channels provided by facility 117 are designated for use by audio, video and data traffic according to the respective blocking probabilities. For example, where audio, video, and data blocking probabilities are guaranteed, as in the bandwidth allocation of FIG. 3, each media type is assigned with a number of B-channels for use by traffic of that media type only. Where the audio and data blocking probabilities are guaranteed and the video blocking probability is not, as in the bandwidth allocation of FIG. 5, each of audio and data media type is assigned with a number of B-channels for use by traffic of that media type only. In addition, a selected number of B-channels are assigned to video traffic, with a subset of that selected number being assigned as data/video channels which may be borrowed by data traffic when a data traffic need arises. Finally, where the audio blocking probability is guaranteed, and the video and data blocking probabilities are expressed by a range, as in the bandwidth allocation of FIG. 6, each media type is assigned with a number of B-channels for use by traffic of that media type only. An additional number of B-channels are designated for borrowing by video or data traffic on a first-come-first-served basis.

In establishing an incoming or outgoing call involving a combination of media, among other things, processor 225 checks call set-up information for the media involved, as indicated at step 710. In accordance with a standard protocol, this call set-up information is provided by a D-channel on facility 117 if it is an incoming call, and by LAN/WAN data converter 220 if it is an outgoing call. In addition to the media information, the call set-up information includes the destination of the call and a request for bandwidth for each media. At step 715, processor 225 checks the call set-up information for the amount of bandwidth for each media involved. Processor 225 translates at step 720 the amount of requested bandwidth to the number of B-channels needed for one of the media involved. Processor 225 then determines whether the B-channels on facility 117, as designated above, can accommodate the required number of B-channels for the media. To that end, processor 225 first checks the availability of the channels dedicated to the media involved, as indicated at step 725. If the capacity of any unused, dedicated channels does not meet the required number, processor 225 then checks at step 727 for additional, available capacity from any borrowing channels assigned to the media pursuant to the particular bandwidth allocation scheme such as that of FIG. 5 or FIG. 6. Process 700 thereafter returns to step 720 for every other media involved, if any. After the channel requirement for each media involved is checked, process 700 proceeds to step 729. If processor 225 determines at step 729 that the number of channels required for each media involved cannot be accommodated, processor 225 causes a signal indicative of a call rejection to be transmitted to the call-originating workstation, as indicated at step 730. Otherwise if the number of channels for at least one but not all of the media involved can be accommodated, processor 225 at step 733 causes a signal to be transmitted to the call-originating workstation, indicating that the call can be partially accommodated, with the missing media identified. It is up to the caller to accept or reject such an incomplete call. This last feature is important especially where audio communications are normally essential and requested in almost every multimedia call. An incomplete call providing no audio media would be highly undesirable and would most likely be rejected by the caller. Finally, if the number of channels for each media involved can be accommodated, processor 225 proceeds to establish the call, as indicated at step 735.

The foregoing merely illustrates the principles of the invention. It will thus be appreciated that those skilled in the art will be able to devise numerous other systems which embody the principles of the invention and are thus within its spirit and scope.

For example, the implementation of a blocking probability in accordance with the invention is not restricted to the illustrative application where the bandwidth of the PRI facility accessing a WAN is limited. Rather, it is generally applicable to communications systems where resources are limited for multiple applications. In one such communications system, a blocking probability is established for each application according to its relative importance, in accordance with the invention.

In addition, the channels used in the disclosed system are illustratively in the unit of an ISDN PRI B-channel. However, the principles of the invention also apply where the channels are subdivisions of the B-channels, or indeed, are not related to the B-channels or ISDN PRI protocol whatsoever, and they may even not be identical to one another in terms of their bandwidth or protocol utilized.

Finally, although the disclosed multimedia communications system is embodied in the form of various discrete electronic blocks and components, the invention could equally well be embodied in a system in which the functions of any one or more of those blocks and components or indeed, all of the functions thereof, are realized, for example, by one or more appropriately programmed processors.

We claim:

1. Apparatus for allowing completion of a call in a communications system having a plurality of channels, said call communicating information through at least one of a plurality of media, comprising:

means for dividing said plurality of channels into subsets of channels;

means for assigning to each of said plurality of media one of said subsets of channels, the number of channels in each subset assigned to a respective media being a function of at least a predetermined blocking probability associated with said respective media;

means for determining an identity of each media involved in the call and the number of channels required for the media involved; and means for allowing the call to be completed when the required number of channels for at least one of the media involved in the call is not greater than the number of available channels assigned to the media.

2. The apparatus of claim 1 wherein the plurality of media include at least one of audio, video and data media.

3. The apparatus of claim 1 wherein each subset of channels assigned to a selected one of the media is for use by traffic of the selected media only.

4. The apparatus of claim 1 wherein at least one subset of channels assigned to a selected one of the media is for use by traffic of the selected media and at least one other media.

5. The apparatus of claim 1 wherein said plurality of channels are not identical.

6. The apparatus of claim 1 wherein said required number of channels are not identical.

7. The apparatus of claim 1 wherein said at least a blocking probability includes a range of blocking probabilities.

8. A system for communicating information involving at least one of a plurality of media comprising:

means for allocating bandwidth for communications on each of said plurality of media, the amount of bandwidth allocated to a respective media being a function of at least a predetermined blocking probability associated with said respective media;

means for identifying each media which said information involves; and means for allowing communications when the bandwidth allocated to at least one of the identified media is sufficient for communicating information associated therewith.

9. The system of claim 8 further comprising a network over which the communications are achieved.

10. The system of claim 9 wherein said network is a wide area network (WAN).

11. The system of claim 9 wherein said bandwidth is provided by a facility accessing said network.

12. The system of claim 11 wherein said facility comprises a plurality of channels in accordance with an integrated services digital network (ISDN) primary rate interface (PRI) standard.

13. The system of claim 8 wherein said information is provided by a terminal connected to a local area network (LAN).

14. The system of claim 13 wherein said LAN includes an Ethernet LAN.

15. The system of claim 8 wherein said plurality of media include at least one of audio, video and data media.

16. A method for allowing completion of a call in a communications system having a plurality of channels, said call communicating information through at least one of a plurality of media, comprising the steps of:

dividing said plurality of channels into subsets of channels;

assigning to each of said plurality of media one of said subsets of channels, the number of channels in each subset assigned to a respective media being a function of at least a predetermined blocking probability associated with said respective media;

determining an identity of each media involved in the call and the number of channels required for the media involved; and allowing the call to be completed when the required number of channels for at least one of the media involved in the call is not greater than the number of available channels assigned to the media.

17. The method of claim 16 wherein the plurality of media include at least one of audio, video and data media.

18. The method of claim 16 wherein each subset of channels assigned to a selected one of the media is for use by traffic of the selected media only.

19. The method of claim 16 wherein at least one subset of channels assigned to a selected one of the media is for use by traffic of the selected media and at least one other media.

20. The method of claim 16 wherein said plurality of channels are not identical.

21. The method of claim 16 wherein said required number of channels are not identical.

22. The method of claim 16 wherein said at least a blocking probability includes a range of blocking probabilities.

23. A method for communicating information involving at least one of a plurality of media comprising the steps of:

allocating bandwidth for communications on each of said plurality of media, the amount of bandwidth assigned to a respective media being a function of at least a predetermined blocking probability associated with said respective media;

identifying each media which said information involves; and allowing communications when the bandwidth allocated to at least one of the identified media is sufficient for communicating information associated therewith.

24. The method of claim 23 wherein said plurality of media include at least one of audio, video and data media.

* * * * *